(12) United States Patent
Balogh

(10) Patent No.: US 7,588,195 B2
(45) Date of Patent: Sep. 15, 2009

(54) DEICING APPARATUS

(75) Inventor: Robert A. Balogh, Timberlake, OH (US)

(73) Assignee: Louis Berkman Winter Products, Cleveland, OH (US)

( * ) Notice: Subject to any disclaimer, the term of this patent is extended or adjusted under 35 U.S.C. 154(b) by 460 days.

(21) Appl. No.: 11/327,748

(22) Filed: Jan. 6, 2006

(65) Prior Publication Data

US 2006/0180678 A1     Aug. 17, 2006

Related U.S. Application Data

(60) Provisional application No. 60/642,032, filed on Jan. 7, 2005.

(51) Int. Cl.
*A01G 25/06*     (2006.01)
(52) U.S. Cl. .......................... 239/201; 239/67; 239/69; 239/302; 239/327; 239/337; 239/379
(58) Field of Classification Search ................. 239/1, 239/202, 200, 201, 169, 172, 290, 296, 272, 239/302, 67, 69, 337, 379
See application file for complete search history.

(56) References Cited

U.S. PATENT DOCUMENTS

| | | | | |
|---|---|---|---|---|
| 2,681,828 A * | 6/1954 | Pollard | ............................ | 134/5 |
| 2,989,246 A * | 6/1961 | Sloane | ........................ | 239/204 |
| 3,213,913 A * | 10/1965 | Petriello | ..................... | 383/120 |
| 3,814,320 A * | 6/1974 | Skurray | ....................... | 239/127 |
| 4,161,280 A * | 7/1979 | Kasinskas | ........................ | 239/1 |
| 4,222,044 A * | 9/1980 | Boschung | ................... | 340/581 |
| 4,880,051 A | 11/1989 | Ohashi | | |
| 4,898,330 A * | 2/1990 | Betchan | ....................... | 239/135 |
| 5,028,017 A * | 7/1991 | Simmons et al. | ......... | 244/134 C |
| 5,282,590 A * | 2/1994 | Zwick | ..................... | 244/134 C |
| 5,447,272 A * | 9/1995 | Ask | ............................... | 239/7 |
| 5,746,396 A | 5/1998 | Thorton-Trump | | |
| 5,810,247 A * | 9/1998 | Petroff | ........................... | 239/1 |
| 6,042,023 A * | 3/2000 | Ask | ............................ | 239/272 |
| 6,047,926 A * | 4/2000 | Stanko et al. | ............ | 244/134 R |
| 6,126,083 A * | 10/2000 | Boschung et al. | ............... | 239/1 |
| 6,237,861 B1 * | 5/2001 | Northrop et al. | .......... | 239/284.1 |
| 6,270,020 B1 | 8/2001 | Thompson et al. | | |
| 6,293,498 B1 * | 9/2001 | Stanko et al. | ........... | 244/134 R |
| 6,360,992 B1 * | 3/2002 | Stanko et al. | ............ | 244/134 R |
| 6,382,523 B1 * | 5/2002 | Hedegard | ..................... | 239/172 |
| 6,477,730 B1 * | 11/2002 | Marrero | ....................... | 15/53.1 |
| 6,547,187 B2 * | 4/2003 | Foster | ..................... | 244/134 C |
| 6,616,102 B1 * | 9/2003 | Bond | ....................... | 244/134 R |
| 6,853,804 B2 * | 2/2005 | Whitinger | ..................... | 392/488 |
| 6,955,304 B2 * | 10/2005 | Beach et al. | ..................... | 239/1 |
| 2003/0210903 A1 | 11/2003 | Whitinger | | |
| 2004/0129829 A1 | 7/2004 | Hoerle et al. | | |
| 2005/0072859 A1 * | 4/2005 | Beach et al. | ................. | 239/201 |

\* cited by examiner

*Primary Examiner*—Dinh Q Nguyen
(74) *Attorney, Agent, or Firm*—Emerson, Thomson & Bennett; Roger D. Emerson; Timothy D. Bennett

(57) ABSTRACT

A deicing apparatus may include a reservoir containing a deicing agent, a distribution network, and at least a first nozzle, for deicing a surface, such as a sidewalk. In one embodiment, at least one or more of the reservoir or distribution network is located underground and at least one or more of the reservoir, distribution network, and nozzle is operatively fixed with respect to the associated surface. The apparatus may further be provided with pumping means for pumping the deicing agent through the apparatus.

18 Claims, 5 Drawing Sheets

DEICING APPARATUS

This application claims priority from provisional patent application, U.S. Ser. No. 60/642,032, filed Jan. 7, 2005, which is incorporated herein by reference.

I. BACKGROUND OF THE INVENTION

A. Field of Invention

This invention pertains to methods and apparatuses for deicing high traffic areas and surfaces, such as sidewalks, bus stops, roadways and the like. More specifically, this invention pertains to a apparatus for delivering a deicing agent from a refillable reservoir to the surface through a substantially fixed distribution network terminating in one or more nozzles defining spray zones.

B. Description of the Related Art

Many methods and apparatuses for the delivery of de-icing agents are known in the art. Deicing agents, such as sand, salt, and brine solutions, may be spread by hand or machine; rotary spreaders may be used to deposit salt and sand, while large trucks may deliver salt to roadways or pump deicing solution onto the surfaces of airplanes. These systems all have in common the need for substantial human involvement in the process of depositing the deicing agent. While it may be appropriate to have people involved in the process of deicing airplanes, for example, it is often impractical or ineffective to have people involved in deicing high traffic areas and surfaces such as bus stops, sidewalks, and storefront walkways. It may be impractical because of the remoteness of the surface to be deiced, the relatively small area to be deiced, or the time frame in which de-icing is required. It may be ineffective because a significant ice event; namely, an event wherein freezing rain, sleet, snow, or hail is present or anticipated, can severely tax the ability of a person or crew to reach a location to be deiced or timely deposit the deicing agent. A wide scale ice event could leave many high traffic areas dangerously icy, while areas deemed more important are attended to first. There is also risk that many locations will not be properly deiced or will be poorly or incompletely deiced.

It would be advantageous, therefore, to provide an apparatus that is installed adjacent to a high traffic area and which is suitable for depositing a deicing agent, such as a brine solution, onto the surrounding surfaces. The apparatus could be turned on manually, remotely, or in response to the detection of an ice-event or conditions giving rise to an ice event. Once in operation, the apparatus could spread the deicing agent without further human intervention, except, perhaps, to turn the apparatus off. It would also be advantageous for the apparatus to deposit the deicing agent in a substantially consistent, though adjustable, pattern, so that deicing is consistent. Finally, it would be advantageous to provide an apparatus that is easy to recharge with deicing agent after the de-icing process has completed. Such an advantageous apparatus and method is provided with the present invention.

II. SUMMARY OF THE INVENTION

According to one aspect of the present invention, a deicing apparatus is provided, having a reservoir, a distribution network in fluid communication with the reservoir, and at least a first nozzle at the terminus of the distribution network for distributing the deicing agent to an associated surface area.

According to another aspect of the present invention, the deicing apparatus is provided with pumping means for pumping the deicing agent from the reservoir to the nozzles through the distribution network.

According to another aspect of the present invention, at least one or more of the reservoir, distribution network, or nozzles is operatively fixed with respect to the surface area to be deiced.

According to yet another aspect of the present invention, at least one or more of the reservoir or distribution network is substantially underground.

According to another aspect of the present invention, the apparatus may be operated manually.

According to another aspect of the present invention, the apparatus may be operated remotely.

According to another aspect of the present invention, the apparatus may be operated in response to sensing an ice event or conditions giving rise to an ice event.

According to another aspect of the present invention, the distribution network may be divided into sub-networks for de-icing distinct zones.

According to yet another aspect of the present invention, the apparatus may be selectively operable to provide deicing agent to one or more selected zones.

According to yet another aspect of the present invention, the apparatus may be selectively programmable to provide deicing agent at specific time intervals.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
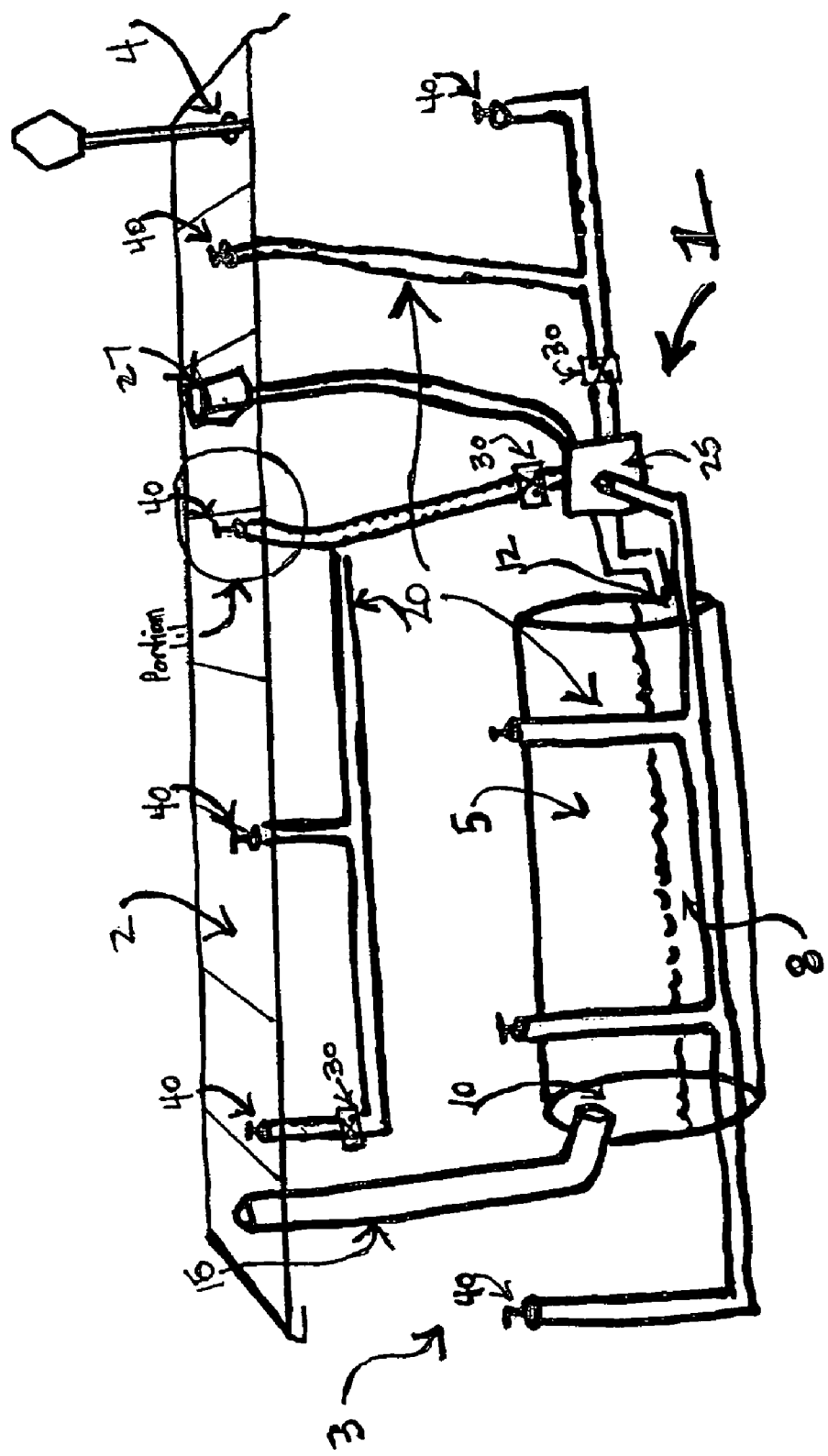
FIG. 1 is a schematic representation of a deicing apparatus shown installed partially underground, in accordance with the present invention.
Figure 2:
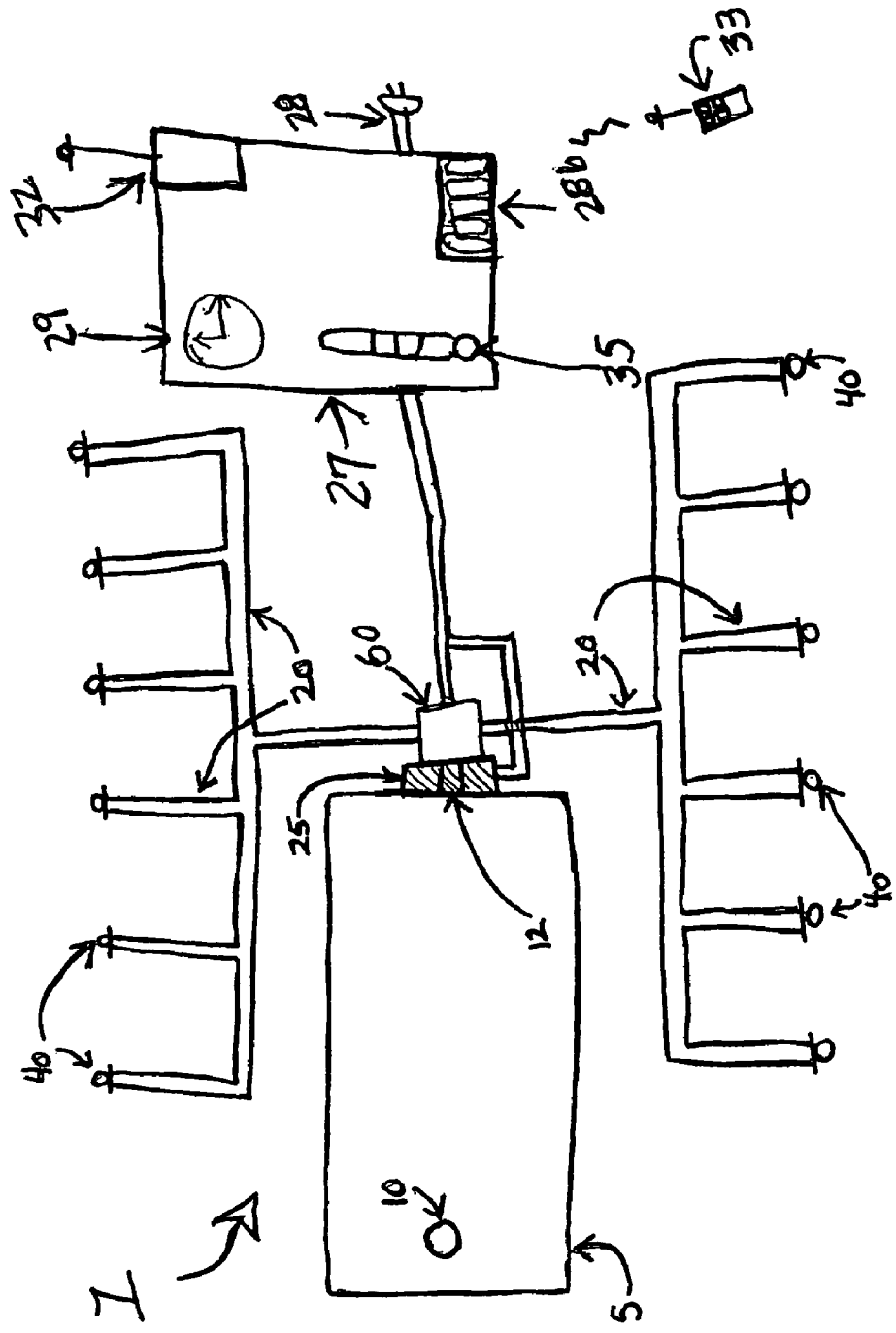
FIG. 2 is an alternative schematic representation of a deicing apparatus of the present invention.

Referring now to the drawings wherein the showings are for purposes of illustrating a preferred embodiment of the invention only and not for purposes of limiting the same, FIGS. 1 and 2 show a de-icing apparatus 1 according to the present invention. The apparatus 1 may include a reservoir 5, a distribution network 20 in fluid communication with the reservoir, and at least a first nozzle 40 situated along the distribution network 20. Each nozzle 40, as seen best in FIG. 3, may be adapted for depositing a deicing agent 8 stored in the reservoir 5 onto an adjacent associated surface generally shown at 2, 3, 4 to be deiced. Surfaces that may be deiced with the apparatus 1 of the present invention may include any surface that is subject to icing or snow buildup, and particularly surfaces that bear pedestrian or vehicular traffic, such as sidewalks 2, crosswalks and roadways 3, bus stops 4, parking lots, driveways, and pathways. These described surfaces areas are exemplary and not intended to be limiting, as any surface that may be exposed to an accumulation of ice or snow may be deiced with the present invention.

Continuing with reference to FIGS. 1-2, the reservoir 5 may be a storage container for deicing agent 8. In one embodiment, the reservoir 5 may be a substantially enclosed storage tank having a capacity to hold sufficient deicing agent 8 to adequately deice the associated surfaces 2, 3, 4 to be deiced. The volume of the storage tank 5 may be selected based on the available space for the tank 5, the surface area to be deiced, the anticipated amount of deicing agent 8 that will be deposited between refills of the reservoirs, or any other factor that would be relevant to the amount of deicing agent 8 that an associated user desires to store adjacent the surfaces to be deiced. The tank 5 may be constructed of a rigid, corrosion resistant material, such as plastic, fiberglass, stainless or galvanized steel. The tank 5 may define a fixed volume. Alternatively, the tank 5 could be constructed of a flexible, corrosion resistant material, such as a rubber bladder, wherein the volume is not fixed.

With ongoing reference to FIGS. 1-2, the reservoir 5 may be adapted for filling and refilling with deicing agent 8. In this way, the reservoir may be provided with an infill port 10, through which the reservoir 5 can be refilled with deicing agent 8. The infill port 10 may be located near or at the top of the reservoir 5 in order to allow for substantially complete filling of the reservoir 5. The infill port 10 may be adapted for receiving an associated fill device (not shown) or the infill port 10 may be adapted to receive the constituents that comprise the deicing agent 8. For example, in one embodiment, the deicing agent 8 may be a liquid deicing agent, such as a brine solution, which may be pumped into the reservoir 5 from an associated tanker truck. In this instance, the infill port 10 may be adapted to receive the end of the tanker truck's pump hose. Alternatively, one could create a brine solution by adding granular salt and water into the reservoir 5. In this instance, the infill port 10 may be adapted for receiving both liquid and granular materials. For example, the infill port 10 may be provided with a funnel attachment for more easily allowing granular materials into the reservoir. The infill port 10 may also be adapted to prevent unauthorized access to the reservoir 5, such as by having a lockable cap to prevent unauthorized persons from depositing foreign material into the reservoir 5.

The reservoir 5 may also be provided with an outflow port 12 through which deicing agent 8 may pass out of the reservoir 5 and into the distribution network 20 for deposition onto the associated surface areas 2, 3, 4. The outflow port 12 may be selectively opened and closed by means of a plug (not shown) or cap in the event that the distribution network 20 needs to be separated from the reservoir 5 for maintenance or repair.

With continuing reference to FIGS. 1-2, the distribution network 20 may be a network of tubes, pipes or other hollow channels that are in fluid communication between the reservoir 5 and at least a first nozzle 40 (discussed below). By "fluid communication", it is meant that deicing agent 8 may flow, even if selectively, from the reservoir 5 into the distribution network 20. The distribution network 20 is deemed to be in fluid communication with the reservoir 5, even though the deicing agent 8 passes from the reservoir 5, through one or more intervening components, such as a pumping means 25 or a distribution control manifold 60 (shown in FIG. 2), before entering the distribution network 20. The distribution network 20 may include a network of inflexible pipe. Alternatively, the distribution network 20 may include a network of flexible pipe. In another embodiment, the distribution network 20 may include flexible pipe in part and inflexible pipe in part.

The pipe or tubing used in the construction of the distribution network 20 may be any corrosion resistant material suitable for transporting the deicing agent 8. Materials such as poly-vinyl chloride (PVC), copper, fiberglass reinforced plastic, stainless steel, and other natural or man-made materials and alloys may be used in the distribution network 20.

Figure 4:
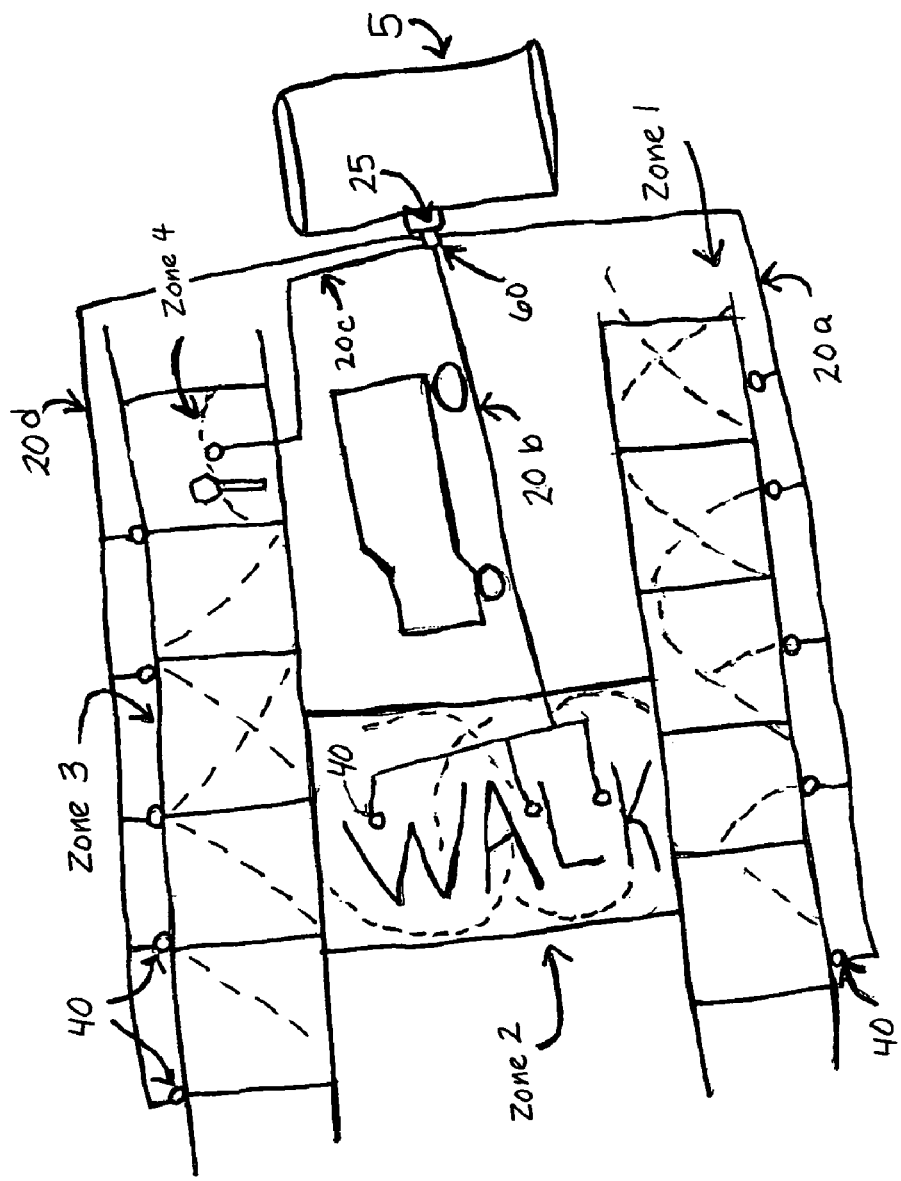
FIG. 4 is a representation of a plurality of deicing zones, which may be deiced by the apparatus of the present invention.

Referring to FIGS. 1, 2 and 4, the distribution network 20 may provide the means by which the deicing agent 8 is transported from the reservoir 5 to the associated surfaces 2, 3, 4 to be deiced. The distribution network 20 may be arrayed similar to an in-ground sprinkler system network used in watering lawns. Accordingly, the distribution network 20 may be assembled in such a way that, during operation, the deicing agent 8 flows throughout the entire distribution network 20 and all surfaces are deiced as a single zone by one or more nozzles 40. Alternatively, it may be appropriate to define multiple de-icing zones (see, for example, zones 1, 2, 3, and 4 shown in FIG. 4) and assemble the distribution network 20 in such a way as to have a plurality of sub-distribution networks 20a, 20b, 20c, 20d, wherein, each sub-distribution network 20a, 20b, 20c, 20d may serve in transporting deicing agent 8 to a separate zone. For example, as depicted in FIG. 4, zone 1 may be a sidewalk, zone 2 may be a crosswalk, zone 3 may be a different sidewalk, and zone 4 may be a bus stop area. Of course, the zones just described are exemplary and not intended to be limiting. Zones may be distinct areas of the same larger parcel or zones may be distinct parcels. In this way, however, a plurality of zones can be selectively treated with the deicing agent 8 by closing off portions of the distribution network 20.

Referencing FIGS. 1-2, there are a variety of ways for selectively controlling the flow of deicing agent 8 through the distribution network 20 as a means of deicing different zones. For example, each sub-distribution network of pipes 20a, 20b, 20c, 20d may be physically distinct from each other, having its own set of nozzles 40, an independent connection to the reservoir 5, and a fluid control means 30, such as a control valve (shown in FIG. 1), which may be operated to selectively control the flow of deicing agent into the sub-distribution network 20a, 20b, 20c, 20d downstream of the control valve 30. Incorporation of fluid control means 30 throughout the distribution network 20 may enable the associated user to control which nozzles 40 deposit deicing agent 8. Where a control valve is used as the fluid control means 30, the control valve may be a manually adjustable control valve or an automatically adjustable control valve. The control valve may be a ball valve, gate valve or any other type of valve selected with sound engineering judgment, which may be selectively closed or opened in order to permit or restrict the flow of deicing agent 8 past the valve.

Alternatively or in addition, there may be provided a distribution control manifold 60 (shown in FIGS. 1, 2 and 4) which is in fluid communication with the reservoir 5 and from which each sub-distribution network 20a, 20b, 20c, 20d extends. The distribution control manifold 60 may include a plurality of gates or valves, having at least one gate or valve at the head of each sub-distribution network 20a, 20b, 20c, 20d. In this embodiment, the deicing agent 8 may enter the distribution manifold 60 and then be selectively directed into specific sub-distribution networks 20a, 20b, 20c, 20d as determined by the associated user. The distribution control manifold 60 may be controlled manually, mechanically or electronically to provide open and closed sub-distribution networks 20a, 20b, 20c, 20d by means of selectively opening or closing the gates or valves contained therein.

Figure 3:
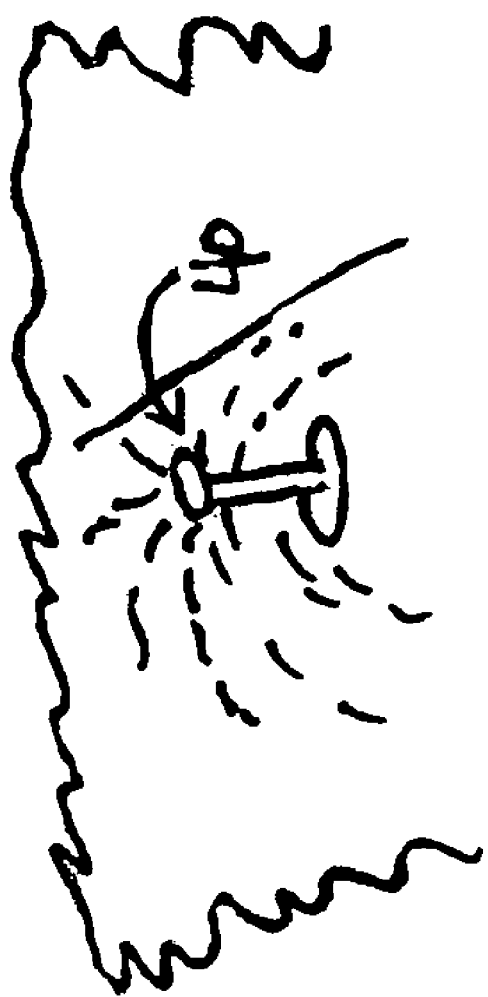
FIG. 3 is an exploded view of Portion 1.1 from FIG. 1, showing an exemplary nozzle.

With reference now to FIGS. 1-3, the apparatus 1 may also include at least a first nozzle 40 located along the distribution network 20. The apparatus 1 may include a plurality of nozzles 40, as shown and the nozzles 40 may be located at the terminus of each arm of the distribution network 20. The nozzles 40 may be adapted for distributing the deicing agent 8 onto the associated surface. In this way, the nozzle 40 may be selected based on the characteristics of the deicing agent 8 and/or the surface to be deiced. In one embodiment, it is contemplated that the deicing agent 8 may be a liquid deicing agent. In this embodiment, the deicing agent 8 may be a brine solution. However, a variety of other liquid, semi-liquid or solid deicing agents 8 are known in the art and may be used with the present invention.

With reference to FIGS. 3-4, in one embodiment, the nozzle 40 may be a spray nozzle. The nozzle 40 may alternatively be a drip nozzle, such as a drip hose. The nozzle 40 may be any nozzle type that is suitable for depositing deicing agent 8 onto the associated surface 2, 3, 4. The nozzle 40 may be a directional nozzle that permits deicing agent 8 to be deposited in a pre-selected pattern. In this way, deicing zones, as described above, may be defined by the single or collective spray patterns of the selected nozzles 40 and the deicing agent 8 can be directed away from surface areas that are not to be treated, such as planting beds, by selecting nozzles 40 having spray patterns that restrict the spraying of deicing agent 8 onto these areas.

With continuing reference to FIGS. 1, 3, and 4, while it is contemplated that the nozzles 40 may be adjustable with respect to spray pattern or type, in one embodiment, it is additionally contemplated that the nozzles 40 may be operatively fixed with respect to the associated surface. By "operatively fixed", it is meant that the nozzle 40 does not substantially move in geographic position with respect to the associated surface. This is not intended to restrict any nozzle 40 from rotating about its axis or from raising vertically from the surface, such as with a pop-up type nozzle. In another embodiment, it is contemplated that one or more of the reservoir 5 or nozzle 40 may be operatively fixed with respect to the associated surface area.

With continuing reference to FIGS. 1-2, the apparatus 1 may further be provided with pumping means 25 for pumping the deicing agent 8 from the reservoir 5 into the distribution network 20, and, ultimately, out the nozzles 40. The pumping means 25 may be an electric pumping means, though any pumping means 25 selected with sound engineering judgment may be employed in accordance with the present invention. The pumping means 25 may be in fluid communication with the reservoir 5. In one embodiment, the pumping means 25 may be located adjacent the outflow port 12 of the reservoir 5 and may pump deicing agent 8 from the reservoir into the distribution network 20. Alternatively, the pumping means 25 may pump deicing agent 8 from the reservoir 5 into the distribution control manifold 60, which may direct the deicing agent 8 into the appropriate distribution or sub-distribution network 20a, 20b, 20c, 20d. The pumping means 25 may be adapted for drawing deicing agent 8 from the reservoir 5 into the distribution network 20. Alternatively, the pumping means 25 may be adapted for pressurizing the reservoir 5 so that deicing agent 8 is pushed into the distribution network 20.

Figure 5:
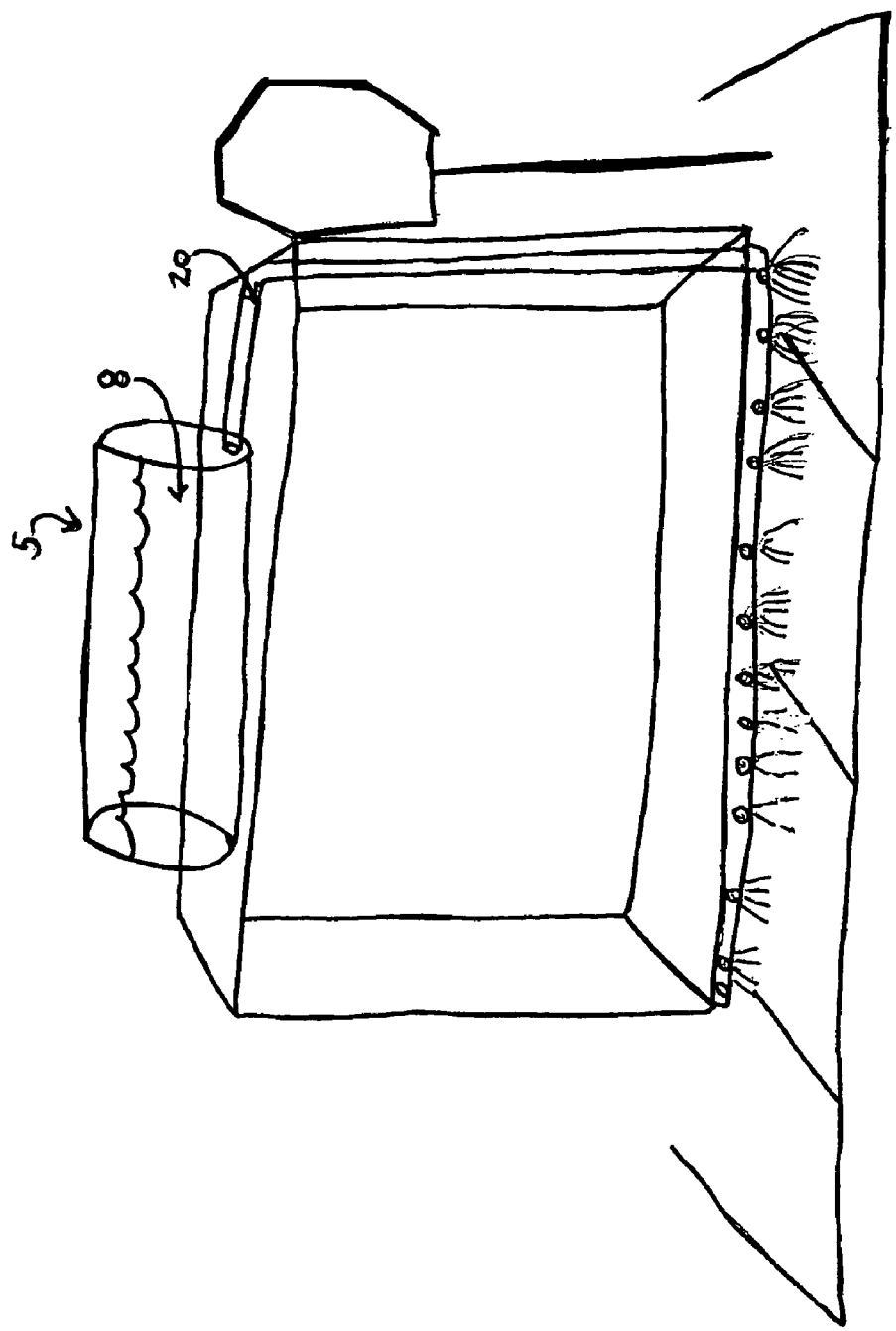
FIG. 5 is a representation of a depiction of an alternative embodiment of the present invention.

With reference now to FIG. 5, it is contemplated that gravity could be used instead of a pumping means 25 to draw deicing agent 8 into the distribution network 20. In this embodiment, the reservoir 5 may be elevated above the distribution network 20 so that the deicing agent 20 would flow downward toward the nozzles 40. For example, as depicted in FIG. 5, the reservoir 5 could be positioned above a bus stop stand, with the distribution network 20 extended downwardly to the surface, where deicing agent 8 may be deposited.

In one embodiment, shown in FIG. 1, it is contemplated that portions of the apparatus 1 including the reservoir 5 and distribution network 20 may be installed substantially underground, adjacent to or below the surface area to be treated. By "substantially underground", it is meant that the portion is installed substantially below the surface. In this way, the apparatus 1 may be hidden from view. By placing portions of the apparatus 1 substantially underground, the apparatus 1 may be protected from the weather and vandalism. In this embodiment, it is contemplated that the nozzles 40 may be the only above ground component of the apparatus 1 (see especially FIG. 3). However, this should not be interpreted as limiting the nozzles 40 used with this invention. Pop-up type nozzles 40 (that is, nozzles that extend from the ground only during use) may be in accordance with the present invention. In an embodiment where at least the reservoir 5 is located underground, there maybe a fill tube 15 extending from the infill port 10 of the reservoir 5 to the surface, to allow for the reservoir 5 to more easily be refilled from the surface.

With reference to FIG. 2, additional components of the apparatus 1 may include primary 28a and secondary 28b power supplies, wherein the primary power supply 28a may be an electricity outlet and the secondary 28b power supply may be a battery, which may be rechargeable. The primary and secondary power supplies 28a, 28b may be operatively communicated to the pumping means 25, any electrically control valves 30, the distribution control manifold 60, or any other component of the apparatus 1 that requires power.

With continued reference to FIG. 2, the apparatus 1 may be provided with a timer 29, which may be operatively communicated with the pumping means 25 to selectively operate the pumping means 25 at selected time intervals. In this way, the apparatus 1 may be turned on and off at pre-selected, pre-programmed time intervals. The apparatus 1 may alternatively or additionally be provided with a receiver 32 operatively communicated with the pumping means 25. The receiver 32 may be adapted to receive a signal from a remote transmitter 33 that may selectively control the pumping means 25. In this way, the apparatus 1 may be turned on and off remotely. In an alternative embodiment, the apparatus 1 may be provided with a sensor 35, such as a temperature sensor, that may be operatively communicated to the pumping means 25 to permit selective operation of the pumping means 25 based on, for example, the outside temperature. In this way, the apparatus 1 may be turned on and off based on selected weather conditions. Other sensors 35 may include motion sensors and ice or water sensors.

With reference to FIG. 1, there may be provided a control panel 27 for selectively, adjustably controlling the components of the apparatus 1, including one or more of the pumping means 25, distribution control manifold 60, and any other valves 30 that may be in the distribution network 20. The control panel 27 may include the timer 29. The control panel 27 may include means for selectively, adjustably, programmably controlling the time of operation of the apparatus 1 and, the flow of deicing agent 8 through the distribution network 20 and the sub-distribution networks 20a, 20b, 20c, 20d.

A method of deicing a surface is also taught herein. While much of the method is inherently disclosed in the description of the apparatus 1 provided above, several embodiments of the method are now described to illustrate an application of the above described apparatus 1.

As depicted in FIGS. 1-5, a method of deicing a surface may include installing an apparatus 1 as described above adjacent to an associated surface area or areas 2, 3, 4 that a user desires to de-ice in the event of a snow storm, freezing rain or other icing event. The surface area may be a high traffic area, such as a pedestrian walkway or bridge or bus stop or a roadway or driveway for vehicular traffic or a store sidewalk. The reservoir 5 of the apparatus 1, which may be a large storage tank, may be installed below ground so that it is not seen and is protected from the weather. The reservoir 5 is filled with deicing agent 8, such as a liquid brine solution. The distribution network 20 described previously may also be installed underground so as not to be seen or be in the way of pedestrian and vehicle traffic. The nozzles 40 at the terminus of the distribution network 20 may be arrayed about the associated surface area so as to adequately cover, with the deicing agent 8, the surface areas to be de-iced. A variety of different types of nozzles 40 having different spray patterns may be selected to provide more complete coverage of the surface area. Additionally, the distribution network 20 may be laid out so as to define a plurality of zones, each serviced by a different sub-distribution network.

With continuing reference to FIGS. 1-5, to de-ice the associated surface, the pumping means 25 may be activated. This results in deicing agent 8 being pumped from the reservoir 5 through the distribution network 20 to the nozzles 40, where is it sprayed onto the associated surface area. After the surface area has received sufficient quantities of deicing agent 8 to adequately melt or prevent ice on the surface area, the pumping means 25 may be deactivated so that the flow of deicing agent stops. When the reservoir 5 contains a sufficiently low level of deicing agent 8, it may be refilled with deicing agent 8 such as with a tanker truck or by mixing deicing agent 8 directly in the reservoir 5.

With reference to FIG. 2, in one embodiment, the apparatus 1 may include one or more of a programmable timer 29 or control panel 27, which are operatively communicated with the pumping means 25. In this embodiment, the apparatus 1 may be programmed to activate and deactivate according to certain programmed conditions, such as time of day. The associated user could program the timer 29 to activate the pumping means for a length of time and then deactivate the pumping means. Alternatively, the associated user could program the timer 29 to activate and deactivate the pumping means at a pre-selected times of day. The control panel 27 may include the timer 29 as well as other programmable controls, such as controls over the operation of valves 30 incorporated into the distribution network 20 or the distribution control manifold 60.

In another embodiment, the distribution network 20 may be laid out to selectively service a plurality of zones, as described above and shown in FIG. 4. In this embodiment, the associated user may program the control panel 27 to activate different zones according to pre-selected selected conditions. For example, the associated user may program selected zones to be de-iced first and other zones to be de-iced later. Thus, for example, in a dual zone system where one zone treats a bus stop and a second zone treats an adjacent street cross walk, it may be appropriate to deice the bus stop area first and the cross walk second. In such a case, the apparatus 1 may be programmed via the control panel 27, which may be operatively communicated with the valves 30 in the distribution network 20 (or, in an alternate embodiment, a distribution control manifold 60), so that the valve 30 opening into the sub-distribution network supplying the bus stop area opens first while the valve opening into the sub-distribution network supplying the cross walk remains closed. Later, the "cross walk" valve 30 may be opened so that deicing agent 8 is deposited on this zone.

In another embodiment, the apparatus 1 may be programmed to activate in response to a sensor 35 reading, such as a temperature sensor reading. In this embodiment, the apparatus 1 may activate when a temperature sensor detects a temperature below freezing. There may additionally be provided an ice or water sensor that senses wet or ice conditions and activates the apparatus 1 when ice or water is detected. In yet another embodiment, there may be included a motion sensor that senses motion and deactivates the apparatus 1 so that the apparatus 1 does not deposit deicing agent 8 while pedestrians or vehicles are on the associated surface area.

As depicted in FIG. 2, in yet another embodiment, described above, the apparatus 1 may be activated by means of a signal sent from a remote transmitter 33 to a receiver 32 that is operatively communicated to one or more of the control panel 27, the pumping means 25, and the valves 30 or distribution control manifold 60. In this embodiment, the apparatus 1 may be activated by sending the activation signal from the remote transmitter 33, which may be in a vehicle, or inside a building, to the receiver 32. In this way, the system may be selectively operated without having to approach the apparatus 1.

Of course, it is anticipated that a variety of other methods of using the apparatus 1 described herein for deicing a surface area may be practiced. The methods described above are exemplary and not intended to be limiting.

Having thus described the invention, it is now claimed:

I claim:

1. A deicing apparatus comprising:
a reservoir for containing a deicing agent, wherein the reservoir comprises a flexible bladder having a variable volume;
a distribution network in fluid communication with the reservoir;
a pumping means for pumping the deicing agent from the reservoir, through the distribution network, through a first nozzle, and to an associated ground surface, wherein a first portion of the first nozzle is fixed to the associated ground surface and a second portion of the first nozzle is adjustable between: (1) an extended use condition where the second portion extends above the ground surface; and, (2) a retracted non-use condition where the second portion is substantially level with the associated wound surface;
a power supply operatively communicated to the pumping means for providing power to the pumping means;
a second nozzle in fluid communication with the reservoir, wherein the first nozzle dispenses the deicing agent to a first deicing zone on the associated ground surface and the second nozzle dispenses the deicing agent to a second deicing zone on the associated ground surface;
a control flow manifold positioned between the reservoir and the first and second nozzles, that selectively controls the flow of the deicing agent to the first and second nozzles; and
a control panel operatively communicated with one or more of the pumping means and the flow control manifold, the control panel being selectively, adjustably programmable for selectively, adjustably controlling one or more of the pumping means and the flow control manifold.

2. The deicing apparatus of claim 1 wherein the deicing agent is a liquid deicing agent.

3. The deicing apparatus of claim 1 further comprising:
a receiver operatively communicated with the pumping means, the receiver adapted for receiving a signal from a transmitter; and
wherein, the signal is a control signal that selectively controls the pumping means.

4. The deicing apparatus of claim 3 wherein the transmitter is a remote transmitter.

5. The deicing apparatus of claim 1 wherein the control panel is selectively, adjustably programmable with respect to: (1) one or more flow rates through the distribution network; (2) the time of day that the pumping means is operational; (3) the length of time that the pumping means is operational; and, (4) the nozzles through which the deicing agent flows.

6. The deicing apparatus of claim 1 wherein the second portion of the first nozzle retracts to a position below the associated ground surface when in the retracted non-use condition.

7. A deicing apparatus comprising:
a reservoir for containing a deicing agent, wherein the reservoir comprises a flexible bladder having a variable volume;
a distribution network in fluid communication with the reservoir;
a pumping means for pumping the deicing agent from the reservoir, through the distribution network, through a first nozzle, and to an associated around surface, wherein a first portion of the first nozzle is fixed to the associated ground surface and a second portion of the first nozzle is adjustable between: (1) an extended use condition where the second portion extends above the ground surface; and, (2) a retracted non-use condition where the second portion is substantially level with the associated ground surface;
a power supply operatively communicated to the pumping means for providing power to the pumping means;
a second nozzle in fluid communication with the reservoir;
a volume detector for detecting the volume of deicing agent remaining in the reservoir;
a sensor operatively communicated with the pumping means for selectively, operatively controlling the pumping means; and,
wherein the sensor is selected from the group consisting of temperature sensors, ice sensors, movement sensors, and volume sensors.

8. The deicing apparatus of claim 7 wherein the first nozzle dispenses the deicing agent to a first deicing zone on the associated ground surface and the second nozzle dispenses the deicing agent to a second deicing zone on the associated ground surface.

9. The deicing apparatus of claim 7 further comprising:
a first control valve in the distribution network, located between the reservoir and the first nozzle, that selectively controls the flow of the deicing agent to the first nozzle; and
a second control valve in the distribution network, located between the reservoir and the second nozzle, that selectively controls the flow of the deicing agent to the second nozzle.

10. The deicing apparatus of claim 9 wherein the first and second control valves are independently operable.

11. The deicing apparatus of claim 7 further comprising:
a control flow manifold positioned between the reservoir and the first and second nozzles, that selectively controls the flow of the deicing agent to the first and second nozzles.

12. The deicing apparatus of claim 7 wherein the deicing agent is a liquid deicing agent.

13. The deicing apparatus of claim 7 wherein the second portion of the first nozzle retracts to a position below the associated ground surface when in the retracted non-use condition.

14. The deicing apparatus of claim 7 further comprising:
a receiver operatively communicated with the pumping means, the receiver adapted for receiving a signal from a transmitter; and
wherein, the signal is a control signal that selectively controls the pumping means.

15. The deicing apparatus of claim 14 wherein the transmitter is a remote transmitter.

16. A deicing apparatus comprising:
a reservoir for containing a deicing agent, the reservoir positioned above an associated ground surface, wherein the reservoir comprises a flexible bladder having a variable volume;
a distribution network located below the reservoir, the distribution network comprising a first nozzle and a second nozzle in fluid communication with the reservoir, wherein a first portion of the first nozzle is fixed to the associated around surface and a second portion of the first nozzle is adjustable between: (1) an extended use condition where the second portion extends above the ground surface; and, (2) a retracted non-use condition where the second portion is substantially level with the associated ground surface;
a control flow manifold positioned between the reservoir and the first and second nozzles, that selectively controls the flow of the deicing agent to the first and second nozzles;
a control panel operatively communicated with the flow control manifold, the control panel being selectively, adjustably programmable for selectively, adjustably controlling the flow control manifold; and
wherein gravity forces the deicing agent from the reservoir, through the distribution network, through the first nozzle, and to the associated ground surface.

17. The deicing apparatus of claim 16 further comprising:
a receiver operatively communicated with the control panel, the receiver adapted for receiving a signal from a transmitter;
wherein, the signal is a control signal that selectively controls the control panel; and
wherein the transmitter is a remote transmitter.

18. The deicing apparatus of claim 16 further comprising:
a first control valve in the distribution network, located between the reservoir and the first nozzle, that selectively controls the flow of the deicing agent to the first nozzle; and
a second control valve in the distribution network, located between the reservoir and the second nozzle, that selectively controls the flow of the deicing agent to the second nozzle;
wherein the first and second control valves are independently operable.

* * * * *